(12) United States Patent
    Kazda et al.

(10) Patent No.: US 10,293,422 B2
(45) Date of Patent: May 21, 2019

(54) BLADE FOR A RECIPROCATING SAW

(71) Applicant: Milwaukee Electric Tool Corporation, Brookfield, WI (US)

(72) Inventors: Austin J. Kazda, Wauwatosa, WI (US); Ryan J. Malloy, Milwaukee, WI (US); Robert W. Butzen, Colgate, WI (US); Andrew J. Schulz, Slinger, WI (US); Roger D. Neitzell, Palmyra, WI (US); Courtney D. McCool, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 307 days.

(21) Appl. No.: 13/782,995

(22) Filed: Mar. 1, 2013

(65) Prior Publication Data

US 2013/0227844 A1 Sep. 5, 2013

Related U.S. Application Data

(60) Provisional application No. 61/605,486, filed on Mar. 1, 2012, provisional application No. 61/707,156, filed on Sep. 28, 2012.

(51) Int. Cl.
  *B23D 49/16* (2006.01)
  *B23D 61/12* (2006.01)

(52) U.S. Cl.
  CPC ......... *B23D 61/128* (2013.01); *B23D 49/162* (2013.01); *B23D 61/123* (2013.01); *Y10T 83/9324* (2015.04)

(58) Field of Classification Search
  CPC ....... B23D 51/10; B23D 49/165; B23D 51/16
  (Continued)

(56) References Cited

U.S. PATENT DOCUMENTS 304,715 A 9/1884 Emerson
511,473 A 12/1893 Szekely
(Continued)

FOREIGN PATENT DOCUMENTS

DE 3838844 5/1990
DE 4316454 11/1994
(Continued)

OTHER PUBLICATIONS

"How-To's for all Band Saw Blades" The Olson Saw Company, Bethel, CT (c)2001.*
(Continued)

*Primary Examiner* — Kenneth E Peterson
*Assistant Examiner* — Liang Dong
(74) *Attorney, Agent, or Firm* — Michael Best & Friedrich LLP (57) ABSTRACT

A blade is usable with a reciprocating saw. The blade includes an attachment portion configured to couple to the reciprocating saw and a body extending from the attachment portion. The body includes a first profile portion and a second profile portion extending from the first profile portion. The second profile portion has a height less than a height of the first profile portion. The blade also includes a plurality of teeth formed on the body and defining a toothed cutting edge. The blade also includes a tip portion formed at a distal end of the second profile portion and terminating in a pointed tip. The pointed tip is configured to punch a hole through the workpiece and includes a toothless cutting edge extending substantially parallel to the toothed cutting edge. The toothless cutting edge extends from the toothed cutting edge to the pointed tip.

43 Claims, 7 Drawing Sheets

(58) Field of Classification Search
USPC .................................................. 30/392–394
See application file for complete search history.

(56) References Cited

U.S. PATENT DOCUMENTS

| | | | |
|---|---|---|---|
| 522,749 A | 7/1894 | Bedell | |
| 709,857 A | 9/1902 | Anderson | |
| 770,094 A | 9/1904 | McGill | |
| 807,227 A | 12/1905 | Wuest | |
| 865,348 A | 9/1907 | Allison | |
| 942,920 A | 12/1909 | Martin | |
| 2,256,847 A | 9/1941 | Osenberg | |
| D170,202 S | 8/1953 | Knapp | |
| 2,781,578 A * | 2/1957 | Guilfoyle | 30/277.4 |
| 2,962,798 A | 12/1960 | Gaskins | |
| 3,005,478 A * | 10/1961 | Laviano | B23D 61/121 |
| | | | 30/123 |
| 3,028,889 A | 4/1962 | McCarthy | |
| 3,033,251 A * | 5/1962 | Atkinson | B23D 61/126 |
| | | | 30/353 |
| 3,213,910 A | 10/1965 | Corlise | |
| 3,262,475 A | 7/1966 | Sweet | |
| 3,285,136 A | 11/1966 | Ritter et al. | |
| 3,395,414 A | 8/1968 | Malin | |
| 3,572,409 A | 3/1971 | Hoffman | |
| 3,596,525 A | 8/1971 | Niesz | |
| 3,680,610 A | 8/1972 | Lindgren | |
| 3,727,258 A | 4/1973 | Brueck | |
| 3,837,024 A * | 9/1974 | Saunders | 7/144 |
| 3,905,105 A | 9/1975 | Tuke | |
| 3,914,906 A | 10/1975 | Barnes | |
| 3,977,289 A | 8/1976 | Tuke | |
| 4,083,112 A | 4/1978 | Palm | |
| 4,131,996 A | 1/1979 | Janke | |
| 4,271,592 A | 6/1981 | Hoptner | |
| 4,339,977 A | 7/1982 | Miller | |
| 4,365,397 A | 12/1982 | Felpel | |
| 4,458,421 A * | 7/1984 | Lew | B23D 49/006 |
| | | | 30/369 |
| 4,661,195 A | 4/1987 | Hopson | |
| 4,787,146 A | 11/1988 | Gaskins | |
| 4,802,396 A * | 2/1989 | Kuklinski | 83/849 |
| 4,870,757 A | 10/1989 | Kirkpatrick et al. | |
| 4,984,369 A | 1/1991 | Flint et al. | |
| 5,009,012 A * | 4/1991 | Martinez et al. | 30/394 |
| 5,042,592 A | 8/1991 | Fisher | |
| 5,095,623 A | 3/1992 | Williams | |
| 5,097,578 A | 3/1992 | Jandl | |
| 5,224,231 A | 7/1993 | Nacar | |
| 5,265,340 A | 11/1993 | Nitz et al. | |
| 5,295,426 A | 3/1994 | Planchon | |
| 5,303,471 A | 4/1994 | Liberatoscioli | |
| 5,353,465 A | 10/1994 | Pierce et al. | |
| D356,020 S | 3/1995 | Costa | |
| 5,398,360 A | 3/1995 | Alexander | |
| 5,448,833 A | 9/1995 | Coon | |
| 5,480,507 A | 1/1996 | Arnold | |
| 5,513,709 A | 5/1996 | Fisher | |
| 5,517,889 A | 5/1996 | Logan | |
| 5,615,746 A * | 4/1997 | Chu | B23D 51/10 |
| | | | 173/171 |
| 5,640,772 A | 6/1997 | Roker et al. | |
| 5,658,193 A | 8/1997 | McCambridge | |
| 5,678,292 A | 10/1997 | Kimbel et al. | |
| 5,687,484 A | 11/1997 | Hahn | |
| 5,697,835 A | 12/1997 | Nitz et al. | |
| 5,809,657 A | 9/1998 | Mortensen | |
| 5,829,082 A | 11/1998 | Moreira | |
| 5,833,014 A | 11/1998 | Dunn | |
| D402,516 S | 12/1998 | Okada | |
| 5,842,278 A | 12/1998 | Gmeilbauer | |
| 5,901,451 A | 5/1999 | Nakayama | |
| 5,901,951 A | 5/1999 | Yamaguchi | |
| 5,918,525 A | 7/1999 | Schramm | |
| 5,957,765 A | 9/1999 | Kimbel et al. | |
| 5,964,039 A | 10/1999 | Mizoguchi et al. | |
| 5,979,058 A | 11/1999 | Henke | |
| 6,021,573 A | 2/2000 | Kikuchi et al. | |
| 6,059,475 A | 5/2000 | Jafarmadar | |
| D427,865 S | 7/2000 | Mills, Jr. | |
| 6,120,363 A | 9/2000 | Dunn | |
| 6,125,544 A * | 10/2000 | Eriksson et al. | 30/166.3 |
| 6,145,426 A | 11/2000 | Ward et al. | |
| 6,149,510 A | 11/2000 | Romagnoli | |
| D442,053 S | 5/2001 | Jimenez | |
| 6,237,179 B1 | 5/2001 | Balceiro | |
| 6,260,825 B1 | 7/2001 | Willis | |
| 6,283,843 B1 | 9/2001 | Romagnoli | |
| D448,634 S | 10/2001 | Hickman | |
| 6,357,122 B2 | 3/2002 | Bachta | |
| 6,393,701 B1 | 5/2002 | Fuchs et al. | |
| 6,401,585 B1 | 6/2002 | Morgan | |
| 6,442,781 B1 | 9/2002 | Chen | |
| 6,481,691 B1 | 11/2002 | Irving | |
| 6,497,046 B1 | 12/2002 | Bardeen et al. | |
| D479,107 S | 9/2003 | Rack | |
| D479,447 S | 9/2003 | Rack | |
| D482,945 S * | 12/2003 | Grolimund | D8/20 |
| 6,668,463 B2 | 12/2003 | Dewberry | |
| D484,759 S | 1/2004 | Rack | |
| D485,140 S | 1/2004 | Rack | |
| D485,141 S | 1/2004 | Rack | |
| D485,142 S | 1/2004 | Rack | |
| D485,479 S | 1/2004 | Rack | |
| 6,678,959 B1 | 1/2004 | Phillip et al. | |
| 6,751,875 B2 | 6/2004 | Jones | |
| 6,754,967 B2 | 6/2004 | Lovell et al. | |
| D493,340 S | 7/2004 | Pyatt | |
| 6,782,781 B2 | 8/2004 | Rack | |
| 6,829,973 B1 | 12/2004 | Yang | |
| 6,871,405 B2 | 3/2005 | Reale et al. | |
| 6,886,261 B2 | 5/2005 | Haut | |
| 6,887,139 B2 | 5/2005 | Jennette | |
| 6,938,531 B2 | 9/2005 | Yoshimizu et al. | |
| 7,036,415 B2 | 5/2006 | Tsujimoto | |
| D527,233 S * | 8/2006 | Burke, III | D8/20 |
| 7,127,979 B2 | 10/2006 | Kocher et al. | |
| D534,401 S | 1/2007 | Duffin et al. | |
| 7,232,112 B2 | 6/2007 | Foster | |
| 7,251,895 B2 | 8/2007 | Kurtz et al. | |
| 7,269,867 B2 | 9/2007 | Karlstedt | |
| D551,923 S | 10/2007 | Ammann | |
| 7,285,038 B1 | 10/2007 | Jioia | |
| D554,452 S | 11/2007 | Ammann | |
| D555,444 S | 11/2007 | Ammann | |
| D565,369 S | 4/2008 | Dawson | |
| 7,451,677 B2 | 11/2008 | Souza et al. | |
| 7,487,704 B2 | 2/2009 | Souza et al. | |
| 7,540,091 B2 | 6/2009 | Fladgard et al. | |
| 7,600,458 B2 | 10/2009 | Hampton et al. | |
| 7,631,584 B2 | 12/2009 | Quinn | |
| 7,661,195 B1 | 2/2010 | Wood et al. | |
| 7,765,631 B2 | 8/2010 | Fisher | |
| 7,779,500 B1 | 8/2010 | Greer | |
| 7,818,887 B2 | 10/2010 | Saegesser et al. | |
| 7,984,914 B1 | 7/2011 | Paulsen | |
| 8,365,419 B2 | 2/2013 | Bernardi et al. | |
| 8,926,410 B2 | 1/2015 | Kalomeris et al. | |
| 2001/0039738 A1 | 11/2001 | Bachta | |
| 2002/0029484 A1 | 3/2002 | Takeuchi | |
| 2002/0144411 A1 | 10/2002 | Brooks | |
| 2003/0014836 A1 | 1/2003 | Kocher et al. | |
| 2003/0014869 A1 | 1/2003 | Rack | |
| 2003/0177646 A1 | 9/2003 | Watanabe | |
| 2004/0163264 A1 | 8/2004 | Simonz | |
| 2004/0187320 A1 | 9/2004 | Haut | |
| 2004/0221405 A1 | 11/2004 | Manfredi | |
| 2005/0199117 A1 | 9/2005 | Quinn | |
| 2005/0211023 A1 | 9/2005 | Kalo | |
| 2005/0235799 A1 | 10/2005 | Hampton et al. | |
| 2005/0262702 A1 | 12/2005 | Hawthorn | |
| 2005/0262709 A1 | 12/2005 | Polk, Sr. | |
| 2006/0016315 A1 | 1/2006 | Zorich et al. | |
| 2006/0037199 A1 | 2/2006 | Alpert | |

(56) References Cited

U.S. PATENT DOCUMENTS

| | | |
|---|---|---|
| 2006/0086218 A1 | 4/2006 | Quinn |
| 2006/0112566 A1 | 6/2006 | Peterson et al. |
| 2006/0137498 A1 | 6/2006 | Bowling |
| 2006/0254044 A1 | 11/2006 | Hao |
| 2007/0033812 A1 | 2/2007 | Kimura |
| 2007/0157476 A1 | 7/2007 | Hunt |
| 2008/0017009 A1 | 1/2008 | Setliff |
| 2008/0115367 A1 | 5/2008 | Glynn |
| 2008/0235955 A1 | 10/2008 | Rosso et al. |
| 2008/0276470 A1 | 11/2008 | Ritter et al. |
| 2009/0004997 A1 | 1/2009 | Allen et al. |
| 2009/0044679 A1 | 2/2009 | Souza et al. |
| 2009/0049973 A1 | 2/2009 | Huffer et al. |
| 2009/0119930 A1 | 5/2009 | Collins |
| 2009/0261539 A1 | 10/2009 | Paulsen |
| 2009/0320299 A1 | 12/2009 | Kuhn et al. |
| 2010/0011594 A1* | 1/2010 | Wysk et al. ............ 30/345 |
| 2010/0218389 A1 | 9/2010 | Kalomeris et al. |
| 2010/0300719 A1 | 12/2010 | Fisher |
| 2011/0179930 A1 | 7/2011 | Brown et al. |
| 2011/0259168 A1 | 10/2011 | Butzen et al. |
| 2011/0314680 A1 | 12/2011 | Zhang et al. |
| 2012/0042765 A1 | 2/2012 | Kazda et al. |
| 2012/0047659 A1 | 3/2012 | Murphy |
| 2012/0073148 A1 | 3/2012 | Sergyeyenko et al. |
| 2012/0090443 A1 | 4/2012 | Butzen et al. |
| 2012/0204353 A1* | 8/2012 | Chu ............................. 7/118 |
| 2012/0255180 A1 | 10/2012 | Powers et al. |
| 2012/0299254 A1 | 11/2012 | Wanstrath |
| 2013/0174701 A1 | 7/2013 | Elliston et al. |
| 2013/0227844 A1 | 9/2013 | Kazda et al. |
| 2013/0228059 A1 | 9/2013 | Kazda et al. |
| 2013/0239418 A1 | 9/2013 | Kehoe |
| 2013/0255016 A1 | 10/2013 | Berney et al. |

FOREIGN PATENT DOCUMENTS

| | | |
|---|---|---|
| EP | 0779123 | 6/1997 |
| GB | 2439291 | 12/2007 |

OTHER PUBLICATIONS

2" Carbide Grit Hole Saw 49-56-0444, Milwaukee Electric Tool Company, Retrieved from Internet on Feb. 29, 2012 <URL: http://www.milwaukeetool.com/accessories/drilling/49-56-0444>.

Reciprocating Saw Blade, SAF-T-KUT, Retrieved from Internet on Jun. 28, 2011 <URL: http://www.saf-t-kut.com/products/reciprocating-saw-blade/>.

Reciprocating Saw Blades, WILPU Sageblatter, Retrieved from Internet on Feb. 26, 2013 <URL: http://wilpu.com/en/products/reciprocating-saw-blades/>.

Dewalt Folding Jab Saw and Rasp, known at least as early as Feb. 10, 2012, 1 page.

* cited by examiner

BLADE FOR A RECIPROCATING SAW

CROSS-REFERENCE TO RELATED APPLICATIONS

This application claims priority to U.S. Provisional Patent Application No. 61/605,486 filed on Mar. 1, 2012, and U.S. Provisional Patent Application No. 61/707,156 filed on Sep. 28, 2012, the entire contents of both of which are incorporated herein by reference.

FIELD OF THE INVENTION

The present invention relates to blades for power tools, and more particularly to a blade for a reciprocating saw.

BACKGROUND OF THE INVENTION

Reciprocating tools, such as reciprocating saws, typically include removable blades to allow for replacement of worn or damaged blades.

SUMMARY

The invention provides, in one aspect, a blade for use with a reciprocating saw imparting movement to the blade in a forward direction and a rearward direction to perform a cutting operation on a workpiece. The blade includes an attachment portion configured to couple to the reciprocating saw and a body extending from the attachment portion. The body includes a first profile portion and a second profile portion extending from the first profile portion. The second profile portion has a height less than a height of the first profile portion. The blade also includes a plurality of teeth formed on the body and defining a toothed cutting edge. The blade also includes a tip portion formed at a distal end of the second profile portion and terminating in a pointed tip. The pointed tip is configured to punch a hole through the workpiece and includes a toothless cutting edge extending substantially parallel to the toothed cutting edge. The toothless cutting edge extends from the toothed cutting edge to the pointed tip.

The invention provides, in another aspect, a reciprocating saw including a housing, a motor supported by the housing, and a blade clamp mechanism supported for reciprocating motion relative to the housing. The reciprocating saw also includes a drive mechanism connected between the motor and the blade clamp mechanism to impart reciprocating motion to the blade clamp mechanism and a blade. The blade includes an attachment portion coupled to the blade clamp mechanism and a body extending from the attachment portion. The body includes a first profile portion and a second profile portion extending from the first profile portion. The second profile portion has a height less than a height of the first profile portion. The blade also includes a plurality of teeth formed on the body and defining a toothed cutting edge. The blade also includes a tip portion formed at a distal end of the second profile portion and terminating in a pointed tip. The pointed tip is configured to punch a hole through the workpiece. The tip portion includes a toothless cutting edge extending substantially parallel to the toothed cutting edge, and the toothless cutting edge extends from the toothed cutting edge to the pointed tip.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
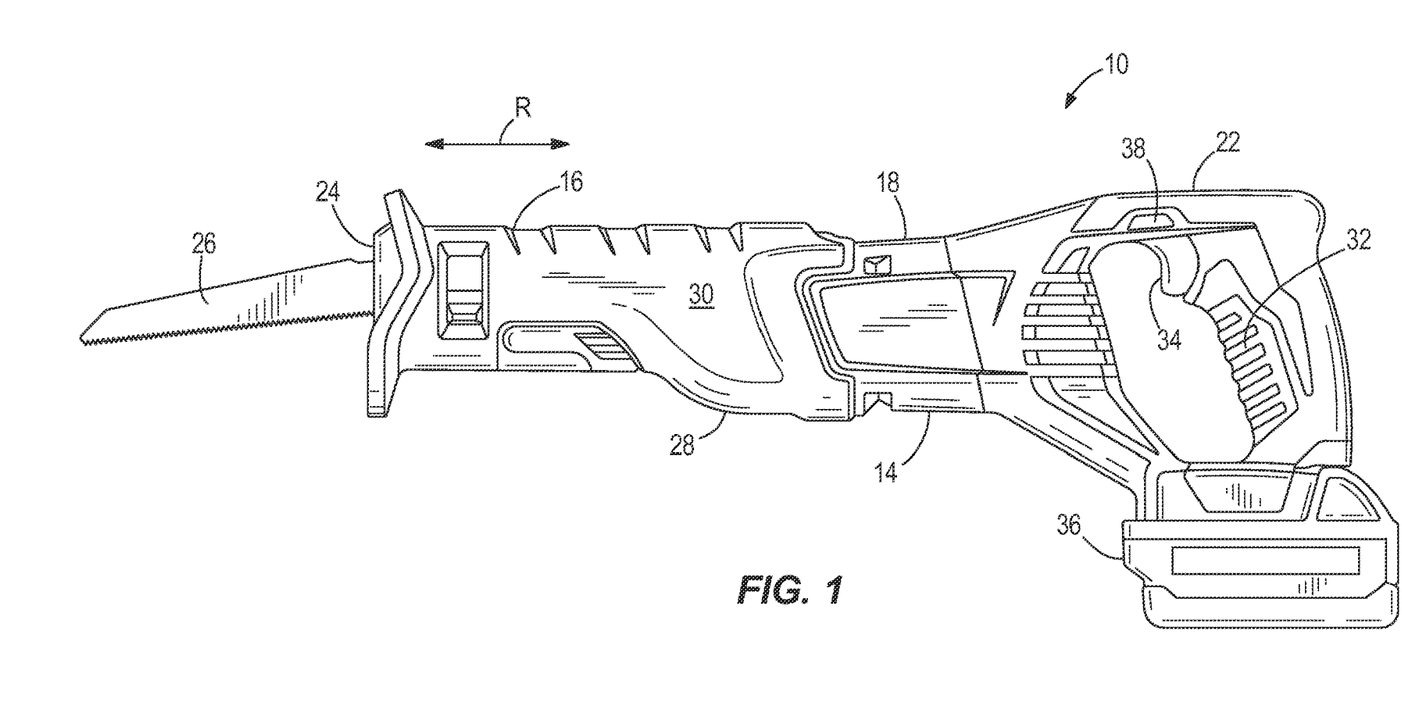
FIG. 1 is a side view of a reciprocating power tool for receiving a blade according to an embodiment of the invention, shown in FIG. 1 receiving a saw blade.
Figure 2:
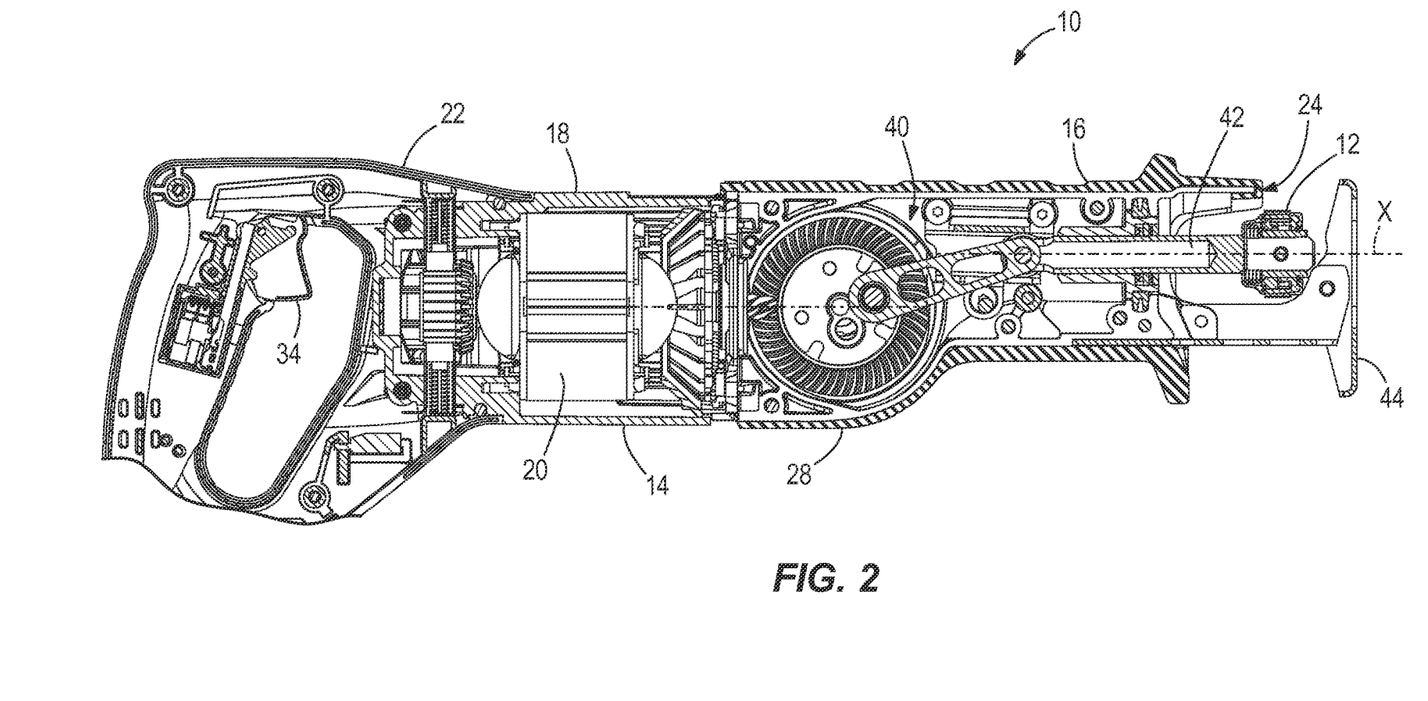
FIG. 2 is a cross-section of the reciprocating power tool shown in FIG. 1 and including a shoe.

FIGS. 1 and 2 illustrate a reciprocating power tool 10 including a blade clamp mechanism 12. The illustrated reciprocating power tool 10 is a reciprocating saw; however, in other embodiments, other reciprocating power tools may include the invention. As shown in FIGS. 1 and 2, the power tool 10 includes a saw housing 14 having a forward portion 16, a body portion 18 housing a motor 20 (FIG. 2), and a handle portion 22. The forward portion 16 of the saw housing 14 includes a blade receiving aperture or end 24 that receives a saw blade 26 (FIG. 1), a blade 46 (FIGS. 3-4B) according to one embodiment of the invention, a blade 46' (FIGS. 5-6) according to another embodiment of the invention, or a blade 46" (FIG. 7) according to another embodiment of the invention, as will be described in greater detail below. The saw blade 26, 46, 46', 46" is releasably coupled to the blade clamp mechanism 12 (FIG. 2) positioned within the saw housing 14, specifically, within the receiving aperture 24. In the illustrated embodiment, a boot or grip portion 28 is positioned over the forward portion 16 of the saw housing 14. In this embodiment, the boot 28 provides a grip area 30 for the user and/or provides protection to the tool 10. In some embodiments, the boot 28 is over-molded onto the forward portion 16. The handle portion 22 includes an over-mold to define an ergonomic grip 32 and allows a user to hold and control the power tool 10.

With continued reference to FIGS. 1 and 2, the power tool 10 includes a trigger-type power switch 34 for activating a power supply 36 of the tool 10 and a button or switch 38 for selecting a speed level (e.g., a high speed or a low speed) for reciprocating the saw blade. In the illustrated embodiment, the power supply 36 is a rechargeable battery pack. The battery pack 36 is releasably coupled to the handle portion 22 to provide power to the power tool 10, and is releasable away from and rearward of the handle portion 22. In the illustrated embodiment, the battery pack 36 is an eighteenvolt (18V) rechargeable power tool battery pack. In other embodiments, the battery pack 36 may be a twelve-volt (12V), a twenty-four-volt (24V), or other various voltages. According to another embodiment, the power supply 36 may be an alternating current (AC) power provided via a corded plug electrically coupled to a wall outlet or any number of suitable powering options.

With reference to the cross section illustrated in FIG. 2, the reciprocating tool 10 also includes a drive mechanism 40 positioned substantially within the housing 14. The drive mechanism 40 is coupled to the motor 20 and to a spindle 42 for transferring rotational motion of a shaft of the motor 20 into reciprocating motion of the spindle 42 along a longitudinal axis X relative to the housing 14. The blade clamp mechanism 12 is disposed at a distal end of the spindle 42 for receiving the blade. The blade clamp mechanism 12 secures the blade to the spindle 42 for reciprocation with the spindle 42 in a direction R (FIG. 1), which is substantially parallel to the longitudinal axis X. In other embodiments, other suitable types and configurations of blade clamp mechanisms may be employed.

The reciprocating tool 10 also includes a removable shoe 44, illustrated in FIG. 2, operable to engage a work piece and provide stability to the tool 10 while cutting. The shoe 44 may be removed when the blade is attached to the blade clamp mechanism 12. The shoe 44 typically acts as a stop to limit the depth of the saw blade 26 into the workpiece and to prevent the workpiece from engaging the saw blade 26 at a connection of the saw blade 26 to the tool 10, e.g., at the blade clamp mechanism 12. In some embodiments, the shoe 44 freely pivots about an axis to allow the user to adjust an angle at which the blade 26 engages the workpiece during a cut. In some embodiments, the reciprocating tool 10 may not include a shoe.

In other embodiments, the power tool 10 may include various handle constructions, drive mechanisms, blade clamp mechanisms, and power configurations. In further embodiments, the power tool 10 may include other types of power and speed control switches or may not include a speed control feature.

Figure 3:
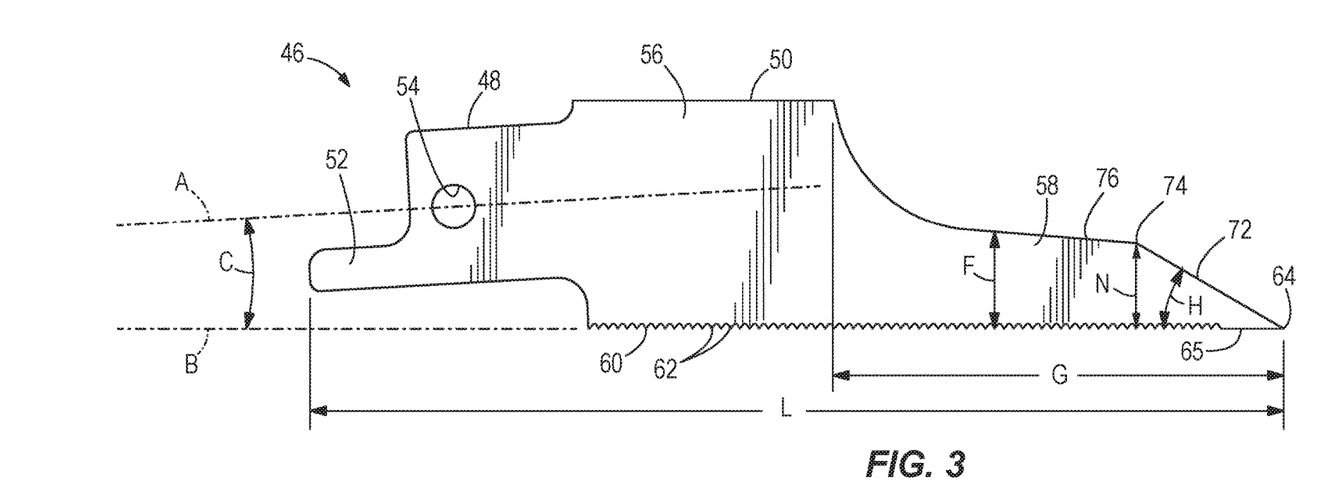
FIG. 3 is a profile view of a blade according to an embodiment of the invention.
Figure 4A:
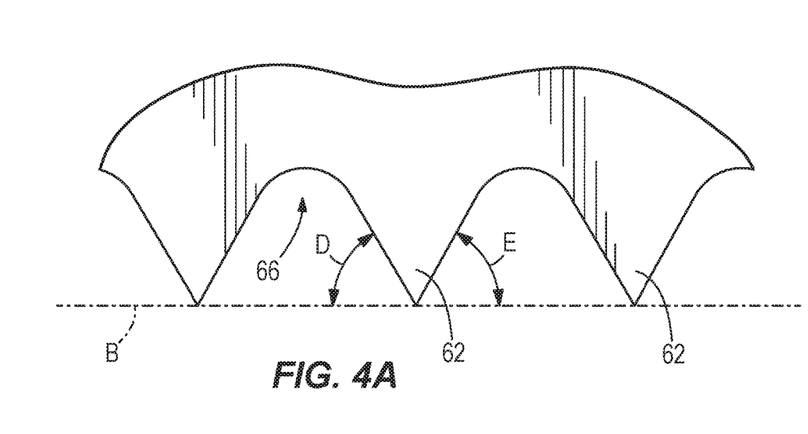
FIG. 4A is an enlarged view of a toothed portion of the blade shown in FIG. 3.
Figure 4B:
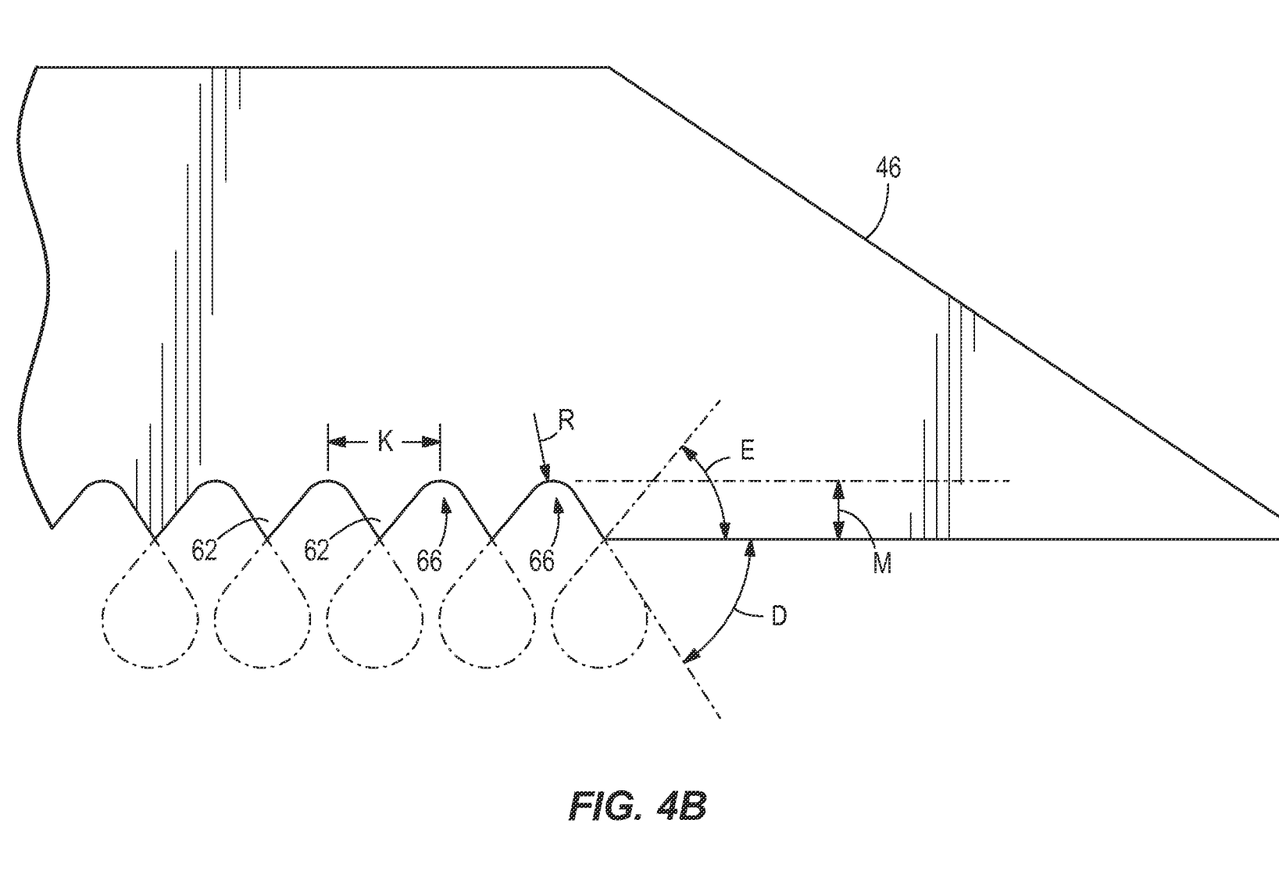
FIG. 4B is another enlarged view of the toothed portion of the blade shown in FIG. 3.

FIGS. 3-4B illustrate the blade 46 according to an embodiment of the invention. The blade 46 is preferably formed from a bi-metal strip, or any hardened steel, and includes an attachment portion 48 and a body 50 extending from the attachment portion 48. The attachment portion 48 includes a tang 52 and an aperture 54, which are configured to engage with the blade clamp mechanism 12 to securely and releasably connect the blade 46 to the reciprocating tool 10. The attachment portion 48 defines a longitudinal axis A that, when attached to the blade clamp mechanism 12, is substantially parallel to the longitudinal axis X of reciprocation of the spindle 42. In some embodiments, the longitudinal axis A is coincident with the longitudinal axis X when the blade 46 is attached to the blade clamp mechanism 12. In other embodiments, other types or configurations of attachment portions may be employed in order to suit the blade clamp mechanism 12 of the reciprocating tool 10. In yet other embodiments, other suitable materials may be used to form the blade 46.

The body 50 includes a tall profile portion 56 extending from the attachment portion 48, a low profile portion 58 extending from the tall profile portion 56, and a cutting edge 60 extending across the tall profile portion 56 and the low profile portion 58. The cutting edge 60 extends substantially along a cutting plane B. The attachment portion 48 is angled with respect to the cutting edge 60 (and the cutting plane B) by a tang angle C. The tang angle C is preferably between about 0 degrees and about 6.5 degrees. In some embodiments, the tang angle C is higher, e.g., about 25 degrees. Therefore, in some embodiments, the tang angle C is between about 0 degrees and about 25 degrees. The cutting edge 60, which may also be referred to as a toothed cutting edge 60, includes teeth 62, which are best illustrated in the enlarged view of FIG. 4A. Preferably, there are between about 18 teeth per inch and about 40 teeth per inch along the cutting edge 60. In the illustrated embodiment, there are about 30 teeth per inch. The teeth 62 have a fine-pitched V-shaped tooth form.

FIGS. 4A and 4B illustrate the teeth 62 in greater detail. Each tooth includes an angle D and an angle E with respect to the cutting edge 60 (and cutting plane B). The angle D is preferably between about 30 and about 70 degrees. The angle E is preferably between about 30 and about 70 degrees. In the illustrated construction, the angle D is about 57 degrees and the angle E is about 53 degrees. The angle E is sometimes referred to as the relief angle. A rake angle is sometimes defined as the measurement of angle D minus 90 degrees, e.g., −33 degrees in the illustrated embodiment. The tooth form also includes gullets 66 having a radius R. The radius R is preferably between about 0.005 and about 0.020 inches. In the illustrated construction, the radius R is about 0.008 inches. Each gullet 66 is spaced from an adjacent gullet 66 by a distance, or pitch, K measured parallel to the cutting edge 60, or cutting plane B. Preferably, the pitch K is between about 0.025 and about 0.055 inches. In the illustrated embodiment, the pitch K is about 0.033 inches. The teeth 62 also have a tooth height M, defined between the tip of the teeth 62 and the peak of the gullets 66. Preferably, the tooth height M is between about 0.010 and about 0.035 inches. The tooth height M is about 0.017 inches in the illustrated embodiment.

A distal end of the blade 46 terminates in a pointed tip 64 located adjacent the cutting teeth 62 at a distal end of the toothed cutting edge 60. The pointed tip 64 is sharp and allows the blade 46 to puncture a workpiece. A toothless cutting edge 65 extends parallel to the toothed cutting edge 60, from the distal end of the toothed cutting edge 60 to the pointed tip 64. The toothless cutting edge 65 allows the pointed tip 64 to puncture the workpiece without catching or binding. The pointed tip 64 includes a tip angle H of about 15 degrees to about 45 degrees at an intersection of the toothless cutting edge 65 and an edge 72. The edge 72 ends opposite the pointed tip 64 in a termination point 74 defined at a junction of the edge 72 and a non-collinear adjacent edge 76 of the low profile portion 58. The tip angle H is about 30 degrees in the illustrated embodiment. In the illustrated embodiment, the body 50 is formed as one piece with the attachment portion 48. In other embodiments, fasteners or fastening means may be employed, such as rivets, screws, bolts, glue, adhesives, welding, soldering and the like.

The blade 46, and more specifically, the body 50, has a material thickness of about 0.035 inches to about 0.080 inches. The overall length L of the blade 46 is between about 2.75 inches and about 4.5 inches. A length G of the low profile portion 58 is between about 1.5 inches and about 3 inches. A height F of the low profile portion 58 is between about 0.25 inches and about 0.625 inches. A height N at the termination point 74 is less than half a height of the tall profile portion 56.

Figure 5:
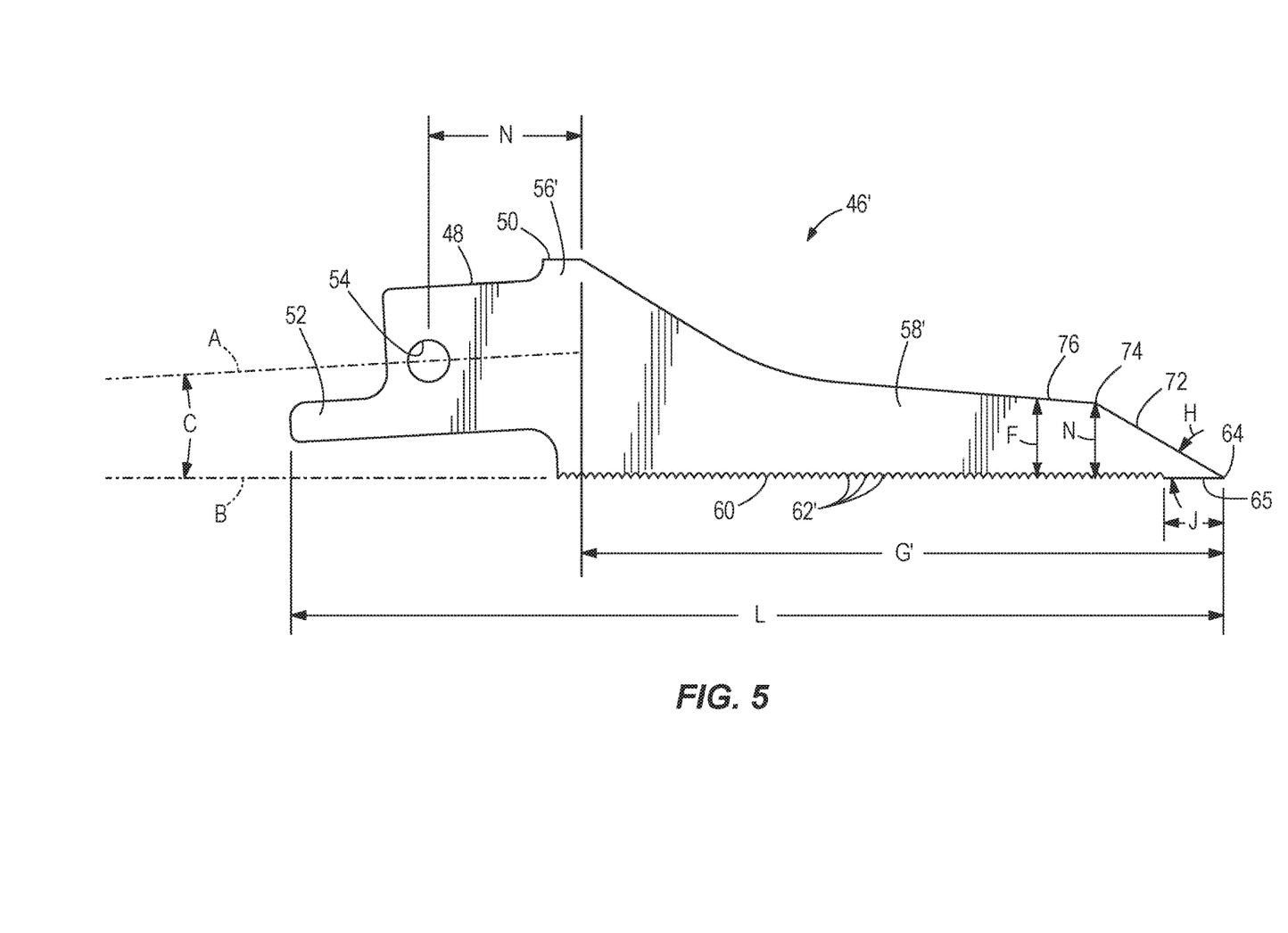
FIG. 5 is a profile view of a blade according to another embodiment of the invention.
Figure 6:
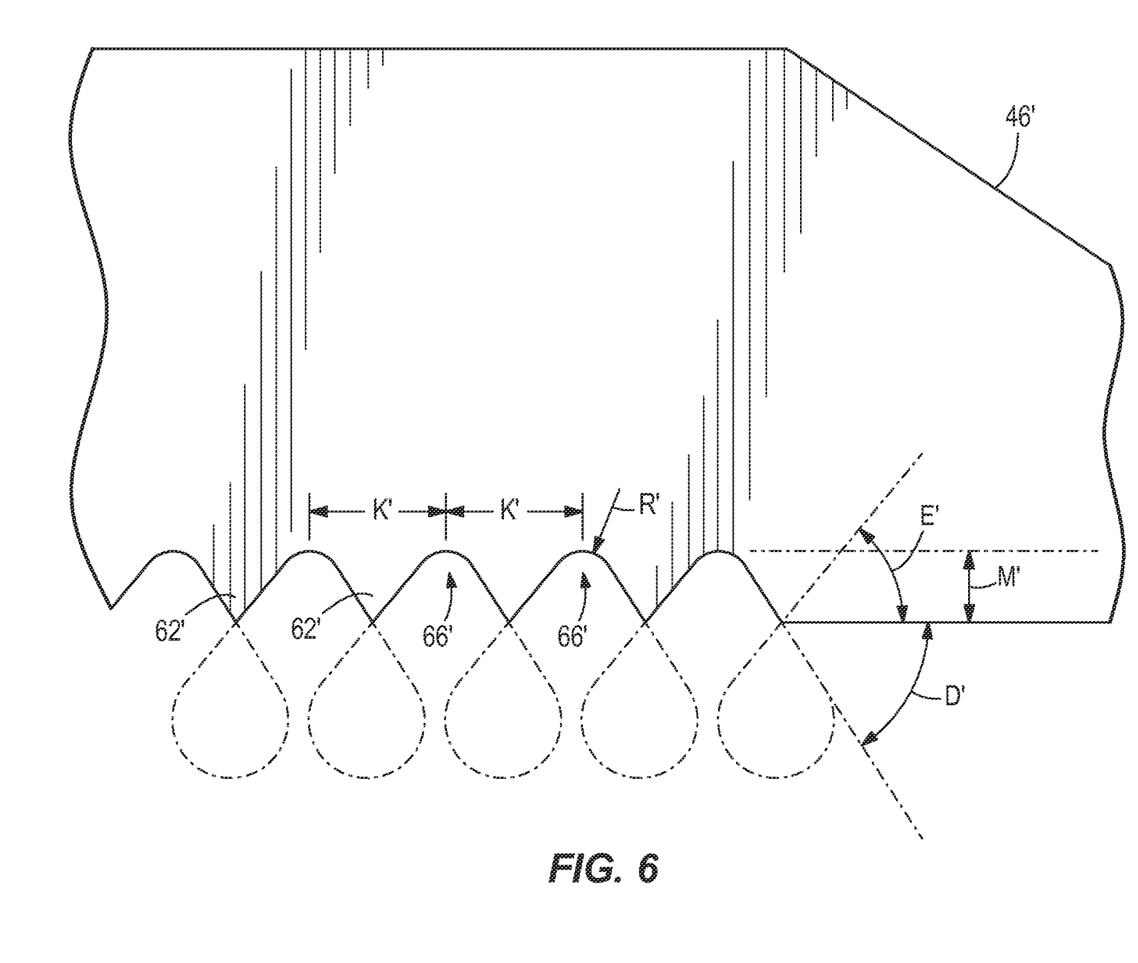
FIG. 6 is an enlarged view of a toothed portion of the blade shown in FIG. 5.

FIGS. 5-6 illustrate a blade 46' according to another embodiment of the invention. The blade 46' is preferably formed from a bi-metal strip, or any hardened steel, and includes an attachment portion 48 and a body 50 extending from the attachment portion 48, a tang 52, an aperture 54, a longitudinal axis A, a tall profile portion 56' extending from the attachment portion 48, a low profile portion 58' extending from the tall profile portion 56', a cutting edge 60, a cutting plane B, and a pointed tip 64, which are described in greater detail above with respect to the blade 46. Like features, accordingly, are labeled the same as those above and need not be described in detail again.

The low profile portion 58' is longer than the low profile portion 58 described above, measured in a direction parallel to the cutting edge 60. The tall profile portion 56' is shorter than the tall profile portion 56 described above, measured in a direction perpendicular to the cutting edge 60. Specifically, the low profile portion 58' has a length G', measured from the junction with the tall profile portion to the tip 64, preferably between about 1.6 inches and about 2.5 inches. In the illustrated construction, the length G' is about 2.4 inches. The tall profile portion 56' has a length N, measured from the center of the aperture 54 to the junction with the low profile portion 58', preferably between about 0.43 to about 1.27 inches. In the illustrated construction, the length N is about 0.53 inches. Thus, a ratio of the length N of the tall profile portion to the length G' of the low profile portion is between about 0.17 and about 0.79 (and is preferably about 0.22). Accordingly, the tall profile portion 56' does not extend as far away from the tang 52 as in the embodiment shown in FIGS. 3-4 such that the tall profile portion 56' does not pass the shoe 44 of the reciprocating tool 10.

The blade 46' also includes a toothless cutting edge 65 that extends parallel to the cutting edge 60, from the distal end of the cutting edge 60 to the pointed tip 64. The toothless cutting edge 65 defines a tip length J. Accordingly, the teeth 62' are spaced from the pointed tip 64 by a distance equal to the tip length J. The tip length J is preferably between about 0.15 and about 0.30 inches. In the illustrated embodiment, the tip length J is about 0.23 inches.

The blade 46' also includes some geometry that is substantially the same as the geometry described above and, accordingly, is labeled the same and need not be described again in detail. Specifically, the blade 46' includes the overall length L, the height F of the low profile portion 58, the tang angle C, and the tip angle H. In the illustrated embodiment, the overall length L is about 3.33 inches (and preferably between about 2.75 to about 4.5 inches, as described above). Thus, a ratio of the length G' of the low profile portion 58' to the overall length L is between about 0.35 and about 0.91 (and is about 0.72 in the illustrated embodiment). The height F of the low profile portion is about 0.25 inches (and is preferably between about 0.25 to about 0.625 inches as described above). The tang angle C is preferably between about 0 and about 10 degrees. The tip angle H is about 30 degrees (and preferably between about 15 to about 45 degrees, as described above).

The cutting edge 60 of the blade 46' includes cutting teeth 62'. FIG. 6 illustrates the tooth form of the cutting teeth 62' in greater detail. In the illustrated construction, the cutting edge 60 includes about 30 teeth per inch. The teeth 62' have a fine-pitched V-shaped tooth form. Each tooth includes an angle D' and an angle E' with respect to the cutting edge 60 (and cutting plane B). The angle D' is preferably between about 30 and about 70 degrees. The angle E' is preferably between about 30 and about 70 degrees. In the illustrated construction, the angle D' is about 57 degrees and the angle E' is about 50 degrees. The angle E' is sometimes referred to as the relief angle. A rake angle is sometimes defined as the measurement of angle D' minus 90 degrees, e.g., −33 degrees in the illustrated embodiment. The tooth form also includes gullets 66' having a radius R'. The radius R' is preferably between about 0.005 and about 0.020 inches. In the illustrated construction, the radius R' is about 0.008 inches. Each gullet 66' is spaced from an adjacent gullet 66' by a distance, or pitch, K' measured parallel to the cutting edge 60, or cutting plane B. Preferably, the pitch K' is between about 0.025 and about 0.055 inches. In the illustrated embodiment, the pitch K' is about 0.033 inches. The teeth 62' also have a tooth height M', defined between the tip of the teeth 62' and the peak of the gullets 66'. Preferably, the tooth height M' is between about 0.010 and about 0.035 inches. The tooth height M' is about 0.017 inches in the illustrated embodiment.

Figure 7:
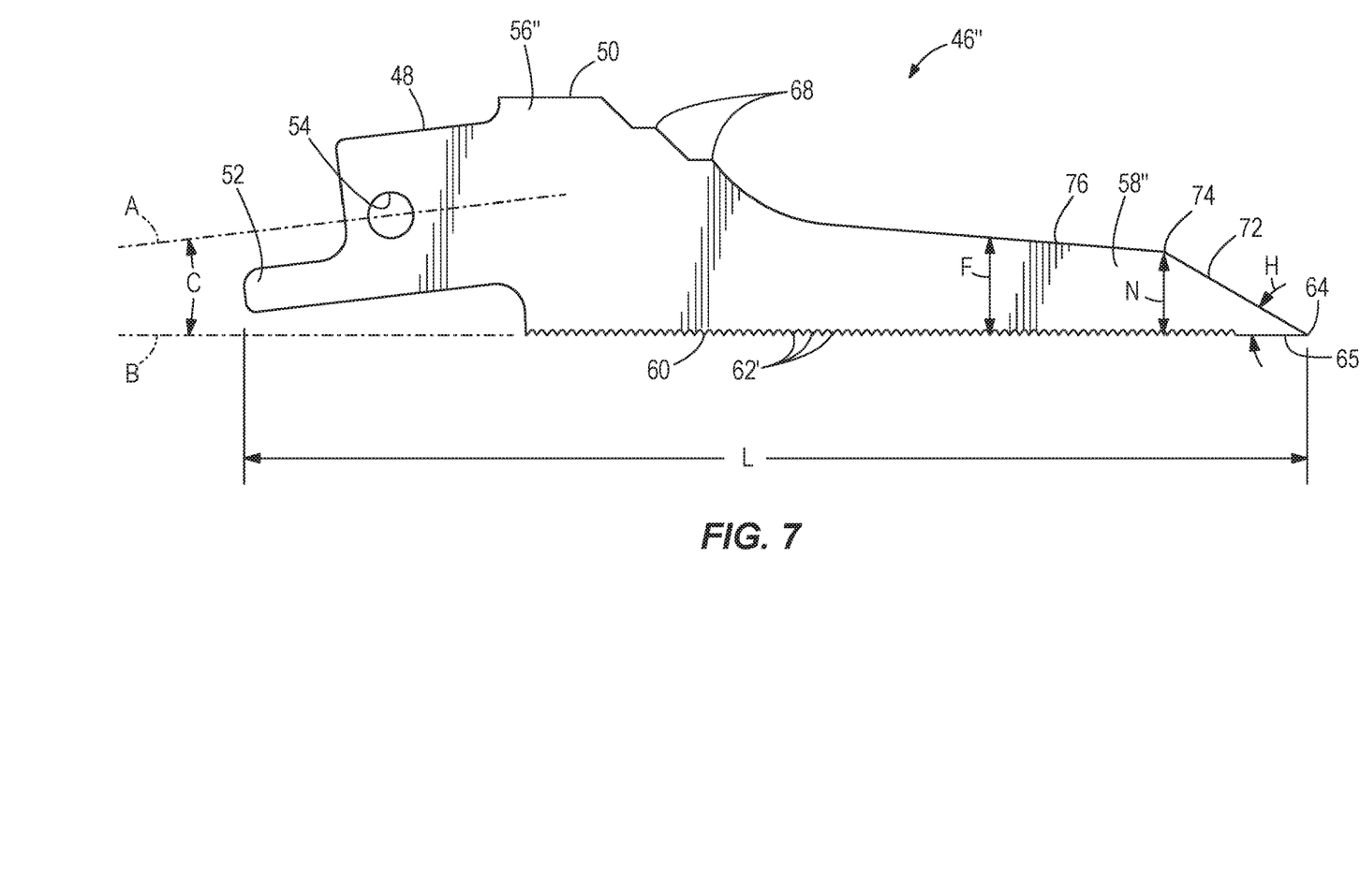
FIG. 7 is a profile view of a blade according to another embodiment of the invention.

FIG. 7 illustrates a blade 46" according to another embodiment of the invention. The blade 46" is substantially similar to the blade 46' shown in FIGS. 5-6 and like parts are labeled with like numerals and need not be described again. The blade 46" includes a tall profile portion 56" and a low profile portion 58". The low profile portion 58" includes steps 68 disposed between the tall profile portion 56" and the pointed tip 64.

The blade 46, 46', 46" is particularly well-suited for cutting duct material in heating, ventilation and air conditioning (HVAC) applications. It should be understood that the terms "about" and "substantially" used herein mean within the manufacturing tolerance of the given dimension as would be understood by one of ordinary skill in the art. In operation, a user attaches the blade 46, 46', 46" to the blade clamp mechanism 12 of the reciprocating power tool 10 and manually jams the pointed tip 64 into the material, similar to stabbing the material with a bayonet. The short length L of the blade 46, 46', 46" and the sharp pointed tip 64 allow the blade 46, 46', 46" to be plunged into duct material with reduced force and without substantial bending. In addition, the toothless cutting edge 65 of the tip 64 prevents the blade 46, 46', 46" from catching or binding when it is jammed into the material. The blade 46, 46', 46" is long enough so that it may remain in the cut during both the back and forward strokes. Specifically, the low profile portion 58 performs the cut and remains in the material during the back and forward strokes. Once in the material, the blade 46, 46', 46" cuts with a reciprocating action imparted by the reciprocating power tool 10. The fine-pitched V-shaped tooth form of the teeth 62 cuts the material in both directions and reduces vibration in the duct material during cutting. The low profile section 58 allows tight radius cuts in the duct material.

Thus, the invention provides, among other things, a blade attachable to a reciprocating saw for making tight radius cuts in HVAC duct material. Various features of the invention are set forth in the following claims.

What is claimed is:

1. A blade for use with a reciprocating saw imparting movement to the blade in a forward direction and a rearward direction to perform a cutting operation on a workpiece, the blade comprising:

an attachment portion configured to couple to the reciprocating saw; a body extending from the attachment portion, the body including a first profile portion and a second profile portion extending from the first profile portion and a transition portion between the first profile portion and the second profile portion, wherein the transition portion is steeper than the first and second profile portions;

a plurality of teeth formed on the body and defining a toothed cutting edge; and a tip portion formed at a distal end of the second profile portion from first and second substantially straight edges intersecting at an angle of less than 90 degrees with respect to each other to form a pointed tip configured to punch a hole through the workpiece, the first substantially straight edge including a toothless cutting edge extending substantially parallel to the toothed cutting edge, wherein the toothless cutting edge extends from the toothed cutting edge to the pointed tip, the second substantially straight edge ending opposite the pointed tip in a termination point defined at a junction of the second substantially straight edge and a non-collinear adjacent edge of the second profile portion, wherein a height at the termination point is less than half a height of the first profile portion;

wherein an overall length of the blade is between about 2.75 inches and about 4.5 inches, measured substantially parallel to the toothed cutting edge from a proximal end of the attachment portion to a distal end of the pointed tip;

wherein the second profile portion includes a profile length between about 1.5 inches and about 3.0 inches, measured substantially parallel to the toothed cutting edge from a proximal end of the second profile portion to the distal end of the pointed tip; and wherein the plurality of teeth are on both the first and second profile portion and have a fine-pitched tooth form having tooth pitch of 0.055 inches or less.

2. The blade of claim 1, wherein the tip portion includes a tip length between about 0.15 inches and about 0.30 inches.

3. The blade of claim 2, wherein the tip length is about 0.23 inches.

4. The blade of claim 1, wherein the plurality of teeth includes between about 18 teeth per inch and about 40 teeth per inch.

5. The blade of claim 4, wherein the plurality of teeth includes about 30 teeth per inch.

6. The blade of claim 1, wherein each tooth includes a tip, the tips collectively defining the toothed cutting edge, and wherein the blade includes a plurality of gullets formed between adjacent teeth, each gullet including a peak.

7. The blade of claim 6, wherein each peak includes a radius between about 0.005 and about 0.020 inches.

8. The blade of claim 7, wherein the radius is about 0.008 inches.

9. The blade of claim 6, wherein each tooth includes a tooth height between about 0.01 inches and about 0.035 inches, measured substantially perpendicular to the toothed cutting edge from the tip of the tooth to the peak of a gullet adjacent the tooth.

10. The blade of claim 9, wherein the tooth height is about 0.017 inches.

11. The blade of claim 1, wherein the overall length is about 3.33 inches.

12. The blade of claim 1, wherein the profile length is about 2.4 inches.

13. The blade of claim 1, wherein the first profile portion includes a profile length between about 0.43 inches and about 1.27 inches, measured substantially parallel to the toothed cutting edge from an attachment point on the attachment portion to the second profile portion.

14. The blade of claim 13, wherein the profile length is about 0.53 inches.

15. The blade of claim 1, wherein a ratio of the profile length to the overall length is between about 0.35 and about 0.91.

16. The blade of claim 15, wherein the ratio of the profile length to the overall length is about 0.72.

17. The blade of claim 15, wherein the blade includes a first profile length measured substantially parallel to the toothed cutting edge from an attachment point of the attachment portion to the second profile portion, and wherein a ratio of the first profile length to the profile length is between about 0.17 and about 0.79.

18. The blade of claim 17, wherein the ratio of the first profile length to the profile length is about 0.22.

19. The blade of claim 1, wherein the height of the second profile portion is between about 0.25 inches and about 0.625 inches.

20. The blade of claim 19, wherein the height of the second profile portion is about 0.25 inches.

21. The blade of claim 1, wherein the body includes a stepped transition portion between the first profile portion and the second profile portion, the stepped transition portion having a height less than the height of the first profile portion and greater than the height of the second profile portion.

22. The blade of claim 1, wherein the angle is between about 15 degrees and about 45 degrees.

23. The blade of claim 22, wherein the angle is about 30 degrees.

24. The blade of claim 1, wherein at least one of the plurality of teeth includes a front edge defining a relief angle with the toothed cutting edge, and wherein the relief angle is between about 30 degrees and about 70 degrees.

25. The blade of claim 24, wherein the relief angle is about 50 degrees.

26. The blade of claim 1, wherein at least one of the plurality of teeth includes a back edge defining an angle with the toothed cutting edge, and wherein the angle is between about 30 degrees and about 70 degrees.

27. The blade of claim 26, wherein the angle is about 57 degrees.

28. The blade of claim 1, wherein the fine-pitched tooth form includes at least 30 teeth per inch.

29. The blade of claim 1, wherein the plurality of teeth have a fine-pitched V-shaped tooth form extending at least across the entire second profile portion up to the first substantially straight edge.

30. A reciprocating saw comprising: a housing;

a motor supported by the housing;

a blade clamp mechanism supported for reciprocating motion relative to the housing; a drive mechanism connected between the motor and the blade clamp mechanism to impart reciprocating motion to the blade clamp mechanism; and a blade including an attachment portion coupled to the blade clamp mechanism; a body including a first profile portion extending from the attachment portion and a second profile portion extending away from the first profile portion and a transition portion between the first profile portion and the second profile portion, wherein the transition portion is steeper than the first and second profile portions;

a plurality of teeth formed on the body and defining a toothed cutting edge; and a tip portion formed at a distal end of the second profile portion from first and second substantially straight edges intersecting at an angle of less than 90 degrees with respect to each other to form a pointed tip, the pointed tip configured to punch a hole through the workpiece, the first substantially straight edge including a toothless cutting edge extending substantially parallel to the toothed cutting edge, wherein the toothless cutting edge extends from the toothed cutting edge to the pointed tip, the second substantially straight edge ending opposite the pointed tip in a termination point defined at a junction of the second substantially straight edge and a non-collinear adjacent edge of the second profile portion, wherein a height at the termination point is less than half a height of the first profile portion;

wherein an overall length of the blade is between about 2.75 inches and about 4.5 inches, measured substantially parallel to the toothed cutting edge from a proximal end of the attachment portion to a distal end of the pointed tip;

wherein the second profile portion includes a profile length between about 1.5 inches and about 3.0 inches, measured substantially parallel to the toothed cutting edge from a proximal end of the second profile portion to the distal end of the pointed tip; and wherein the plurality of teeth are on both the first and second profile portion and have a fine-pitched tooth form having tooth pitch of 0.055 inches or less.

31. The reciprocating saw of claim 30, wherein the tip portion includes a tip length of about 0.23 inches.

32. The reciprocating saw of claim 30, wherein the fine-pitched tooth form includes at least 30 teeth per inch.

33. The reciprocating saw of claim 30, wherein the overall length is about 3.33 inches.

34. The reciprocating saw of claim 30, wherein the profile length is about 2.4 inches.

35. The reciprocating saw of claim 30, wherein the first profile portion includes a first profile length of about 0.53 inches, measured substantially parallel to the toothed cutting edge from an attachment point on the attachment portion to the second profile portion.

36. The reciprocating saw of claim 30, wherein a ratio of the profile length to the overall length is about 0.72.

37. The reciprocating saw of claim 36, wherein the blade includes a first profile length measured substantially parallel to the toothed cutting edge from an attachment point of the attachment portion to the second profile portion, and wherein a ratio of the first profile length to the profile length is about 0.22.

38. The reciprocating saw of claim 30, wherein the height of the second profile portion is about 0.25 inches measured substantially perpendicular to the toothed cutting edge.

39. The reciprocating saw of claim 30, wherein the body includes a stepped transition portion between the first profile portion and the second profile portion, the stepped transition portion having a height less than the height of the first profile portion and greater than the height of the second profile portion.

40. The reciprocating saw of claim 30, wherein the angle is about 30 degrees.

41. The reciprocating saw of claim 30, wherein at least one of the plurality of teeth includes a front edge defining a relief angle with the toothed cutting edge, and wherein the relief angle is about 50 degrees.

42. The reciprocating saw of claim 30, wherein at least one of the plurality of teeth includes a back edge defining an included angle with the toothed cutting edge, and wherein the included angle is about 57 degrees.

43. A blade for use with a reciprocating saw, the blade comprising: an attachment portion configured to couple to the reciprocating saw;

a body including a first profile portion extending from the attachment portion, a second profile portion extending away from the first profile portion, and a transition portion between the first profile portion and the second profile portion;

a plurality of teeth formed on the body and defining a toothed cutting edge; and a tip portion formed at a distal end of the second profile portion from first and second toothless, substantially straight edges terminating in a pointed tip configured to punch a hole through the workpiece, wherein the first and second toothless, substantially straight edges intersect at an angle of less than 90 degrees with respect to each other to form the pointed tip, the first substantially straight edge extending substantially parallel to the toothed cutting edge, wherein the first substantially straight edge extends from the toothed cutting edge to the pointed tip, the second substantially straight edge ending opposite the pointed tip in a termination point defined at a junction of the second substantially straight edge and a non-collinear adjacent edge of the second profile portion, wherein the termination point is disposed between the pointed tip and the attachment portion, and wherein a height at the termination point is less than half a height of the first profile portion;

wherein an overall length of the blade is between about 2.75 inches and about 4.5 inches, measured substantially parallel to the toothed cutting edge from a proximal end of the attachment portion to a distal end of the pointed tip;

wherein the second profile portion includes a profile length between about 1.5 inches and about 3.0 inches, measured substantially parallel to the toothed cutting edge from a proximal end of the second profile portion to the distal end of the pointed tip; and wherein the plurality of teeth are on both the first and second profile portion and have a fine-pitched tooth form having tooth pitch of 0.055 inches or less.

* * * * *